(12) United States Patent
Umeda (10) Patent No.: US 11,325,618 B2
(45) Date of Patent: May 10, 2022

(54) OPERATION CONTROL APPARATUS, OPERATION CONTROL METHOD, AND VEHICLE

(71) Applicant: TOYOTA JIDOSHA KABUSHIKI KAISHA, Toyota (JP)

(72) Inventor: Kazuhiro Umeda, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/790,805

(22) Filed: Feb. 14, 2020

(65) Prior Publication Data
US 2020/0298886 A1   Sep. 24, 2020

(30) Foreign Application Priority Data

Mar. 18, 2019 (JP) .............................. JP2019-049930

(51) Int. Cl.
*B60W 60/00* (2020.01)
*G01C 21/34* (2006.01)

(52) U.S. Cl.
CPC .... *B60W 60/0059* (2020.02); *B60W 60/0018* (2020.02); *B60W 60/0051* (2020.02); *B60W 60/0053* (2020.02); *G01C 21/3461* (2013.01)

(58) Field of Classification Search
CPC .............. G05D 1/0287; G05D 1/0295; G05D 2201/0212; G08G 1/20; G08G 1/096708; B60W 60/0053; H04W 4/44
See application file for complete search history.

(56) References Cited

U.S. PATENT DOCUMENTS 6,317,060 B1 * 11/2001 Jones .................... G08G 1/123
340/989
9,182,764 B1 * 11/2015 Kolhouse ........... G01C 21/3469
(Continued)

FOREIGN PATENT DOCUMENTS

| JP | 11-192948 A | 7/1999 |
| JP | 2000-264210 A | 9/2000 |
| JP | 2019-40588 A | 3/2019 |

OTHER PUBLICATIONS

U.S. Appl. No. 16/729,673, filed Dec. 30, 2019.
(Continued)

*Primary Examiner* — Khoi H Tran
*Assistant Examiner* — Tristan J Greiner
(74) *Attorney, Agent, or Firm* — Oblon, McClelland, Maier & Neustadt, L.L.P.

(57) ABSTRACT

An operation control apparatus executes sending operation instructions to vehicles running in an autonomous driving mode such that a time interval at which the vehicles running in the autonomous driving mode pass a selected point in a route is substantially constant, receiving, from any one vehicle running in the autonomous driving mode, a notification that the vehicle switches into a manual driving mode in response to an instruction of a boarding staff, and sending operation instructions to the vehicle having switched into the manual driving mode and the vehicle that continues running in the autonomous driving mode such that a time interval at which the vehicle having switched into the manual driving mode and the vehicle that continues running in the autonomous driving mode pass a selected point in the route is substantially constant in a set time from when the operation control apparatus has received the notification.

7 Claims, 5 Drawing Sheets

(56) References Cited

U.S. PATENT DOCUMENTS

| | | | |
|---|---|---|---|
| 2004/0243664 A1* | 12/2004 | Horstemeyer | G06Q 30/0269 |
| | | | 709/200 |
| 2014/0197967 A1* | 7/2014 | Modica | G08G 1/0133 |
| | | | 340/932 |
| 2015/0046073 A1* | 2/2015 | Saloner | G08G 1/096716 |
| | | | 701/117 |
| 2019/0025857 A1* | 1/2019 | Luckevich | G05D 1/0295 |
| 2019/0279440 A1* | 9/2019 | Ricci | H04W 4/48 |
| 2020/0080853 A1* | 3/2020 | Tam | G05D 1/0212 |
| 2020/0334987 A1* | 10/2020 | Shoval | G06Q 10/063116 |

OTHER PUBLICATIONS

U.S. Appl. No. 16/778,615, filed Jan. 31, 2020.
U.S. Appl. No. 16/806,301, filed Mar. 2, 2020.
U.S. Appl. No. 16/807,314, filed Mar. 3, 2020.

* cited by examiner

OPERATION CONTROL APPARATUS, OPERATION CONTROL METHOD, AND VEHICLE

INCORPORATION BY REFERENCE

The disclosure of Japanese Patent Application No. 2019-049930 filed on Mar. 18, 2019 including the specification, drawings and abstract is incorporated herein by reference in its entirety.

BACKGROUND

1. Technical Field

The disclosure relates to an operation control apparatus, an operation control method, and a vehicle.

2. Description of Related Art

In recent years, a research and development on autonomous driving of vehicles, such as automobiles and trains, has been proceeding. With such a trend of technical developments as a background, the Ministry of Land, Infrastructure and Transport carries out an autonomous driving trial with a bus on a public road to proceed with verification of the advantageous effects of an autonomous driving technology and consideration of the way of urban traffic, such as the needs of social infrastructure for proceeding with autonomous driving of buses. With such a situation as a background, Japanese Unexamined Patent Application Publication No. 2000-264210 (JP 2000-264210 A) suggests a vehicle transportation system that controls the operations of vehicles in response to instructions from a supervision control system. The vehicle transportation system includes the supervision control system and a standby place. The supervision control system controls the operations of vehicles that run on an exclusive route in a manner of a transportation volume specified schedule. The standby place is a place where vehicles are on standby. The vehicles each are controlled to run so as to reach a position designated by the supervision control system at time designated by the supervision control system.

SUMMARY

In a vehicle transportation system of this type, even when the driving mode of any one of a plurality of vehicles that run in autonomous driving mode has temporarily switched from the autonomous driving mode to a manual driving mode to, for example, avoid an obstacle on a road, but when there is a possibility that the driving mode of that vehicle returns to the autonomous driving mode again, it is desirable to control the operations of the vehicles without any irregularity in the operations of the other vehicles that continue running in autonomous driving mode.

The disclosure reduces an irregularity in operations of other vehicles due to switching of a driving mode of any one of a plurality of vehicles.

An operation control apparatus according to an aspect of the disclosure is an operation control apparatus that controls operations of vehicles that run around along a predetermined route in a driving mode that is any one of an autonomous driving mode and a manual driving mode. The operation control apparatus includes a unit configured to send operation instructions to the vehicles running in the autonomous driving mode such that a time interval at which the vehicles running in the autonomous driving mode pass a selected point in the route is substantially constant, a unit configured to receive, from any one of the vehicles running in the autonomous driving mode, a notification that the vehicle switches into the manual driving mode in response to an instruction of a boarding staff, and a unit configured to send operation instructions to the vehicle having switched into the manual driving mode and the vehicle that continues running in the autonomous driving mode such that a time interval at which the vehicle having switched from the autonomous driving mode to the manual driving mode and the vehicle that continues running in the autonomous driving mode pass a selected point in the route is substantially constant in a set period of time from when the operation control apparatus has received the notification. With this configuration, in consideration of the possibility that the vehicle having switched from the autonomous driving mode to the manual driving mode switches into the autonomous driving mode again, influence that the other vehicle that continues running in the autonomous driving mode receives (a change of the designated position at the designated time, instructed from the operation control apparatus) is reduced, so an irregularity in the operations of the vehicles can be avoided.

An operation management system according to another aspect of the disclosure includes the operation control apparatus and an operation management terminal that an operation management staff who manages the operations of the vehicles operates. The operation control apparatus may be configured to, after a set period of time has elapsed from when the operation control apparatus has received the notification, provide the operation management terminal with a notification that the set period of time has elapsed. With this configuration, an operation management staff who operates the operation management terminal can learn a lapse of a set period of time from when the driving mode of a vehicle has switched from the autonomous driving mode to the manual driving mode. Therefore, for example, it is possible to ask a boarding staff of the vehicle about the operation status of the vehicle through voice speech using a phone line, or the like.

In the operation management system according to the aspect of the disclosure, the operation control apparatus may further include a unit configured to, in response to an instruction from the operation management terminal that has received the notification that the set period of time has elapsed, send operation instructions to the vehicles that continue running in the autonomous driving mode such that a time interval at which the vehicles that continue running in the autonomous driving mode, other than the vehicle having switched from the autonomous driving mode to the manual driving mode, pass a selected point in the route is substantially constant. With this configuration, when there is no possibility that the vehicle having switched from the autonomous driving mode to the manual driving mode switches into the autonomous driving mode again, the operations of the vehicles can be controlled such that a time interval at which the vehicles that continue running in the autonomous driving mode, other than the any one of the vehicles, pass a selected point in the route is substantially constant.

A vehicle according to an aspect of the disclosure runs around along a predetermined route in a driving mode that is any one of an autonomous driving mode and a manual driving mode. The vehicle includes a vehicle control apparatus configured to control running of the vehicle, and a communication device configured to, in response to an instruction from a boarding staff of the vehicle, provide the operation control apparatus with a notification that the vehicle switches the driving mode from the autonomous driving mode to the manual driving mode and runs in the manual driving mode. In the autonomous driving mode, the vehicle control apparatus is configured to control running of the vehicle such that the vehicle moves to a position designated by the operation control apparatus at time designated by the operation control apparatus. In the manual driving mode, the vehicle control apparatus is configured to control running of the vehicle such that, during a set period of time from when the operation control apparatus has received the notification, the vehicle moves to a position designated by the operation control apparatus at time designated by the operation control apparatus. With this configuration, in consideration of the possibility that the vehicle having switched from the autonomous driving mode to the manual driving mode switches into the autonomous driving mode again, influence that the other vehicle that continues running in the autonomous driving mode receives (a change of the designated position at the designated time, instructed from the operation control apparatus) is reduced, so an irregularity in the operations of the vehicles can be avoided.

An operation control method according to an aspect of the disclosure includes a step of sending, by an operation control apparatus that controls operations of vehicles that run around along a predetermined route in a driving mode that is any one of an autonomous driving mode and a manual driving mode, operation instructions to the vehicles running in the autonomous driving mode such that a time interval at which the vehicles running in the autonomous driving mode pass a selected point in the route is substantially constant, a step of receiving, from any one of the vehicles running in the autonomous driving mode, a notification that the any one of the vehicles switches the driving mode into the manual driving mode and runs in the manual driving mode in response to an instruction of a boarding staff, and a step of sending operation instructions to the vehicle of which the driving mode has switched from the autonomous driving mode to the manual driving mode and the vehicle that continues running in the autonomous driving mode such that a time interval at which the vehicle having switched from the autonomous driving mode to the manual driving mode and the vehicle that continues running in the autonomous driving mode pass a selected point in the route is substantially constant in a set period of time from when the operation control apparatus has received the notification. With this configuration, in consideration of the possibility that the vehicle having switched from the autonomous driving mode to the manual driving mode switches into the autonomous driving mode again, influence that the other vehicle that continues running in the autonomous driving mode receives (a change of the designated position at the designated time, instructed from the operation control apparatus) is reduced, so an irregularity in the operations of the vehicles can be avoided.

According to the aspects of the disclosure, it is possible to reduce an irregularity in the operation of the other vehicle due to switching of the driving mode of any one of the plurality of vehicles.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
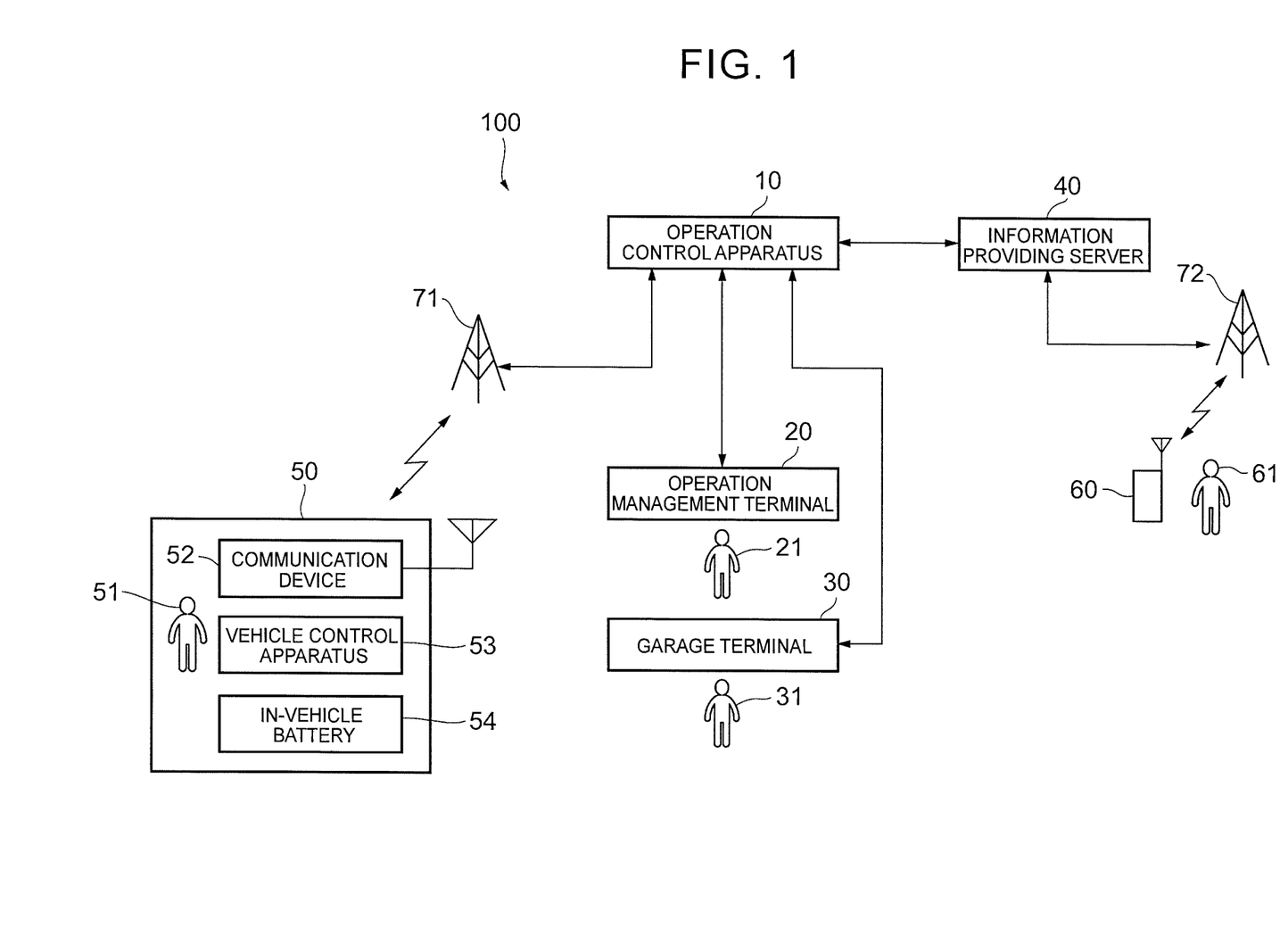
FIG. 1 is a view that illustrates the schematic configuration of an operation management system according to an embodiment of the disclosure.

Hereinafter, an embodiment of the disclosure will be described with reference to the accompanying drawings. Like reference numerals denote the same elements, and the description will not be repeated. FIG. 1 is a diagram that illustrates the schematic configuration of an operation management system 100 according to the embodiment of the disclosure. The operation management system 100 manages and controls scheduled operations of vehicles 50 that run around along a predetermined route. The vehicles 50 include passenger automobiles and trains. Passenger automobiles are automobiles that run along a predetermined route with an indefinite number of passengers being loaded, and include buses (for example, passenger buses and route buses) and taxies (for example, shared taxies). Trains are railway vehicles that run along a predetermined route for the purpose of transporting people or articles. Trains may be single-car trains. Each vehicle 50 is, for example, a motor vehicle that gains propelling force by driving a motor through consumption of electric power that is supplied from an in-vehicle battery 54.

The operation management system 100 includes an operation control apparatus 10, an operation management terminal 20, a garage terminal 30, and an information providing server 40. The operation control apparatus 10 manages the statuses (for example, operation statuses, the states of charge of the in-vehicle batteries 54, and the like) of the vehicles 50 and controls scheduled operations of the vehicles 50. The operation status of each vehicle 50 indicates, for example, whether the vehicle 50 is in operation as scheduled or whether the vehicle 50 is being charged at a garage. When the vehicle 50 is in operation, the operation status of the vehicle 50 indicates the position and speed of the vehicle 50. The state of charge of each vehicle 50 indicates, for example, the amount of charge of the in-vehicle battery 54 of the vehicle 50 and whether there is an abnormality in charging. The operation management terminal 20 receives operation instructions on the vehicles 50 from an operation management staff 21 who monitors the operations of the vehicles 50. For example, in the event of occurrence of abnormality, the operation management staff 21 is able to instruct a stop of all or part of the vehicles 50 running around along the predetermined route. Operation instructions on the vehicles 50 from the operation management staff 21 are input to the operation control apparatus 10 through the operation management terminal 20.

The operation control apparatus 10 controls the operations of the vehicles 50 based on an operation schedule created in advance or based on the operation instructions on the vehicles 50, input from the operation management terminal 20. The garage terminal 30 receives, from the operation control apparatus 10, an instruction to move the vehicle 50 into the garage and an instruction to move the vehicle 50 out of the garage. A service staff 31 moves the vehicle 50 into the garage or moves the vehicle 50 out of the garage in accordance with an instruction received by the garage terminal 30. The garage terminal 30 is, for example, a personal computer or tablet terminal having a communication function. The information providing server 40 receives operation information on the vehicles 50 (for example, scheduled arrival time at each stop, or the like) from the operation control apparatus 10 and provides the received operation information. The information providing server 40 is, for example, a web server that provides operation information described in hypertext mark-up language.

The operation control apparatus 10 is connected to the operation management terminal 20, the garage terminal 30, and the information providing server 40 through a wired or wireless network. An operation instruction on each vehicle 50 from the operation control apparatus 10 is wirelessly sent to the vehicle 50 through a base station 71. Operation information on each vehicle 50 from the information providing server 40 is sent to a communication terminal 60 of a user 61 through a base station 72. The communication terminal 60 is, for example, a mobile communication terminal (a smart phone, a smart watch, a tablet terminal, or the like) or a personal computer having a communication function. The user 61 is able to check operation information on the vehicles 50 through the communication terminal 60 and ride any one of the vehicles 50. The user 61 in the vehicle 50 is called a passenger.

Each vehicle 50 includes a communication device 52, a vehicle control apparatus 53, and the in-vehicle battery 54. The communication device 52 sends or receives information about operation control over the vehicle 50 to or from the operation control apparatus 10. For example, the communication device 52 receives an operation instruction on the vehicle 50 from the operation control apparatus 10. Also, for example, the communication device 52 sends information indicating the statuses of the vehicle 50 (for example, operation status, the state of charge of the in-vehicle battery 54, and the like) to the operation control apparatus 10. The vehicle control apparatus 53 controls driving of the vehicle 50 by switching among a plurality of driving modes (for example, an autonomous driving mode, a semi-autonomous driving mode, a manual driving mode, and a stop mode). The autonomous driving mode is a mode in which the vehicle 50 performs autonomous driving in response to an instruction from the operation control apparatus 10. The semi-autonomous driving mode is a mode in which the vehicle 50 performs autonomous driving without receiving an instruction from the operation control apparatus 10. The manual driving mode is a mode in which the boarding staff 51 of the vehicle 50 drives the vehicle 50 manually. The stop mode is a mode in which driving of the vehicle 50 is stopped.

The vehicle control apparatus 53 includes, for example, an image capturing device (for example, a stereo camera) that captures forward, backward, right, and left situations around the vehicle 50, a position detecting device (for example, a global positioning system) that detects positional information of the vehicle 50, sensors (for example, a millimeter-wave radar) that detect the presence or absence of an obstacle near the vehicle 50, an electronic control unit that controls the output power of the vehicle 50, an electronic control unit that controls the steering angle of the vehicle 50, and an electronic control unit that controls braking of the vehicle 50. The vehicle control apparatus 53 controls the above-described various electronic control units based on images captured by the image capturing device, and information detected by the position detecting device and the sensors, and controls driving of the vehicle 50 in response to an operation instruction from the operation control apparatus 10.

Figure 2:
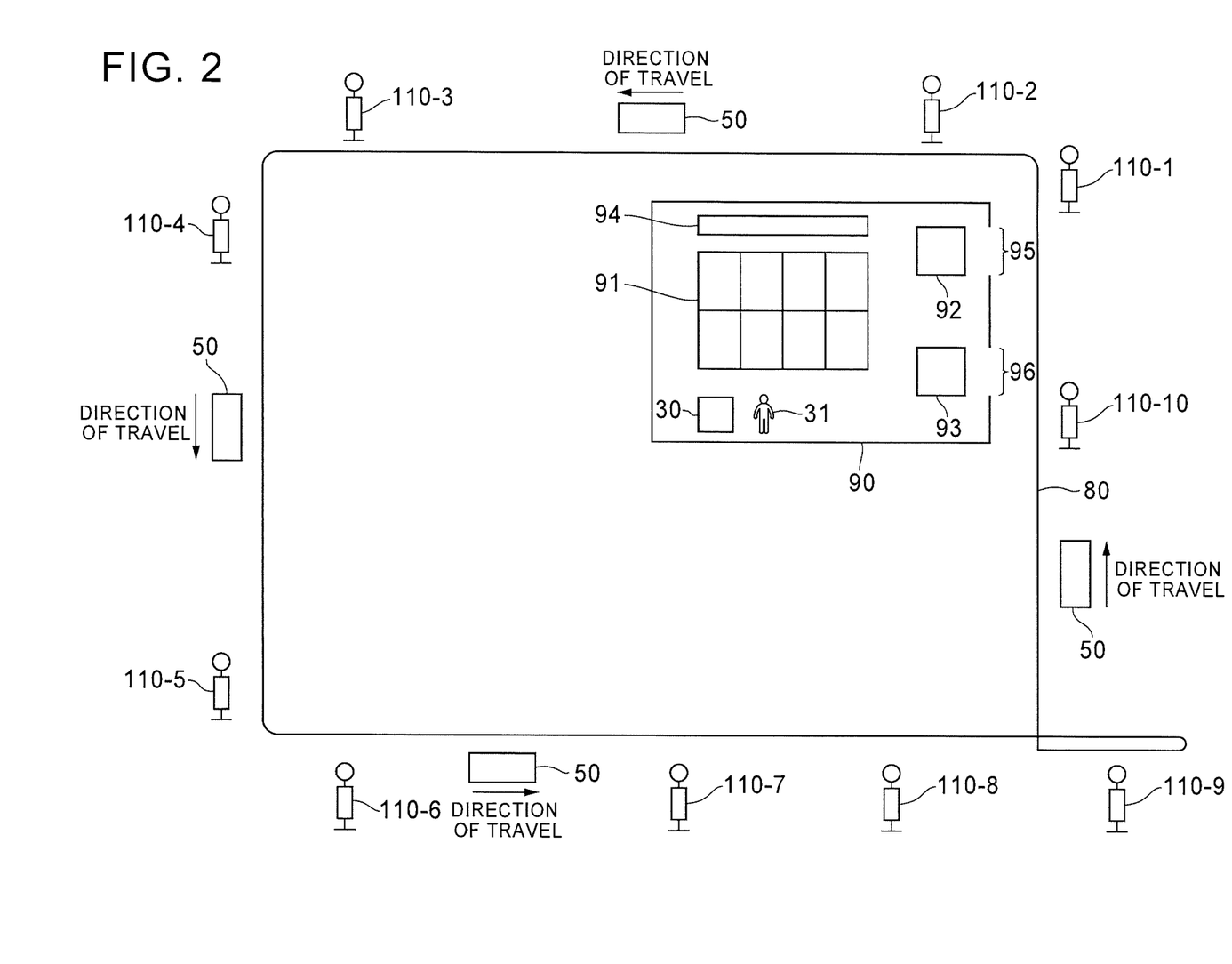
FIG. 2 is a view that illustrates the schematic configurations of a route and garage according to the embodiment of the disclosure.

FIG. 2 is a view that illustrates the schematic configuration of a route 80 and a garage 90 according to the embodiment of the disclosure. The garage 90 includes a parking space 91 zoned so that the vehicles 50 park, a standby space 92 zoned so that the vehicle 50 can wait to move from the garage 90 to the route 80, a standby space 93 zoned so that the vehicle 50 can wait to move from the route 80 to the garage 90, and a charging facility 94 for charging the in-vehicle battery 54 of the vehicle 50. The standby space 92 is provided near an exit 95 of the garage 90. The standby space 93 is provided near an entrance 96 of the garage 90. Autonomous driving control over the vehicle 50 by the operation control apparatus 10 sets a time point at which the vehicle 50 starts running from the standby space 92 toward the route 80 as a starting time point and a time point at which the vehicle 50 moves from the route 80 and stops in the standby space 93 as an end time point. The garage terminal 30 is provided in the garage 90. As the garage terminal 30 receives an instruction to move the vehicle 50 out of the garage from the operation control apparatus 10, the service staff 31 manually moves the vehicle 50 from the parking space 91 to the standby space 92 (out of the garage). As the garage terminal 30 receives an instruction to put the vehicle 50 into the garage from the operation control apparatus 10, the service staff 31 manually moves the vehicle 50 from the standby space 93 to the parking space 91 (into the garage). Each vehicle 50 is able to charge the in-vehicle battery 54 with electric power supplied from the charging facility 94 while being parked in the parking space 91.

The route 80 is constructed in a closed curve shape so that the vehicles 50 can run around. When each vehicle 50 is a passenger automobile, the route 80 is a road. In a road in which a plurality of lanes is provided, the route 80 means a lane in which the vehicles 50 run. When each vehicle 50 is a train, the route 80 is a rail. One or more stops 110 are provided in the route 80. Each vehicle 50 stops at each stop 110 and opens and closes a door(s) regardless of whether there is a passenger who gets on or off Each vehicle 50 runs around along the route 80 in the same direction while repeating a stop at each stop 110 in the route 80. When each vehicle 50 is a train, the stops 110 may be called "stations". In the example shown in FIG. 2, for the sake of convenience of description, the case where the number of the stops 110 is ten is illustrated; however, the number of the stops 110 is not limited to ten. When the stops need not be distinguished from one another, the stops are collectively referred to as stops 110. On the other hand, when the stops need to be distinguished from one another, the stops are referred to as stops 110-1, 110-2, . . . , 110-10. Particularly, of these stops 110, the stop 110-1 closest to the exit 95 of the garage 90 is referred to as "farthest stop", and the stop 110-10 closest to the entrance 96 of the garage 90 is referred to as "closest stop". The order in which the vehicle 50 stops at the stops 110 starting from the garage 90 is the order of the stops 110-1, 110-2, . . . , 110-10. The farthest stop 110-1 is a stop of which the turn of stop starting from the garage 90 is the earliest. The closest stop 110-10 is a stop of which the turn of stop starting from the garage 90 is the latest. When the vehicle 50 runs around along the route 80, the stop at which the vehicle 50 stops next after the closest stop 110-10 is the farthest stop 110-1.

The operation control apparatus 10 adjusts the number of the vehicles 50 that run around along the route 80, based on an operation schedule. For example, in an off-peak time period for passengers to use the vehicles, the number of the vehicles 50 that run around along the route 80 may be reduced; while in an on-peak time period for passengers to use the vehicles, the number of the vehicles 50 that run around along the route 80 may be increased. The operation control apparatus 10 may, for example, send an instruction to the garage terminal 30 such that, of the vehicles 50 running along the route 80, any one of the vehicles 50 of which the amount of charge is lower than a threshold is put into the garage 90. The operation control apparatus 10 may, for example, send an instruction to the garage terminal 30 such that, of the vehicles 50 parked in the garage 90, any one of the vehicles 50 of which the amount of charge is greater than or equal to the threshold runs along the route 80. The operation control apparatus 10 is able to adjust the number of the vehicles 50 running around along the route 80 by appropriately changing the vehicles 50 running along the route 80 and the vehicles 50 parked in the garage 90.

Figure 3:
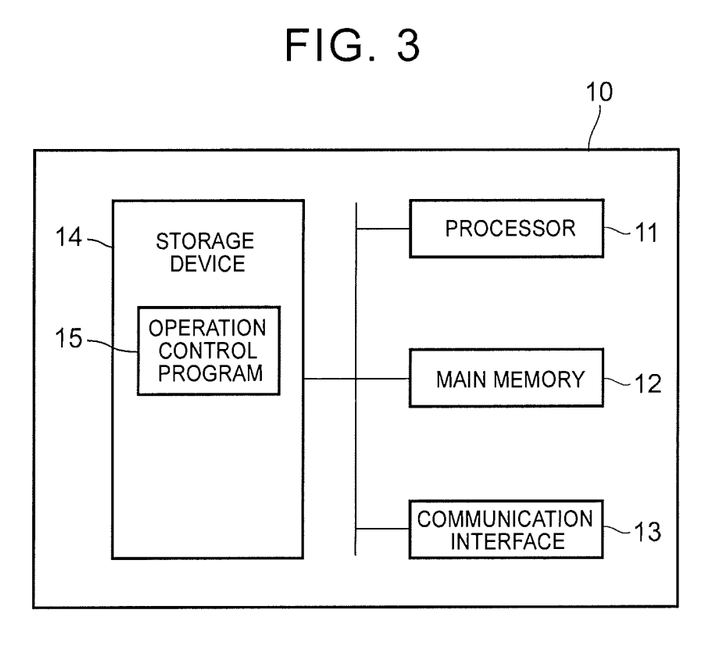
FIG. 3 is a view that illustrates the hardware configuration of an operation control apparatus according to the embodiment of the disclosure.

FIG. 3 is a view that illustrates the hardware configuration of the operation control apparatus 10 according to the embodiment of the disclosure. The operation control apparatus 10 includes a processor 11, a main memory 12, a communication interface 13, and a storage device 14. The storage device 14 is a computer-readable recording medium, such as a disk medium (for example, a magnetic recording medium or a magneto-optical recording medium) and a semiconductor memory (for example, a volatile memory or a nonvolatile memory). Such a recording medium may be referred to as, for example, a non-transitory recording medium. An operation control program 15 for controlling the operations of the vehicles 50 is stored in the storage device 14. The operation control program 15 is read from the storage device 14 onto the main memory 12 and interpreted and run by the processor 11. Thus, an operation control method according to the present embodiment is executed. The communication interface 13 controls communication between the operation control apparatus 10 and its communication targets (the vehicles 50, the operation management terminal 20, the garage terminal 30, and the information providing server 40).

Figure 4:
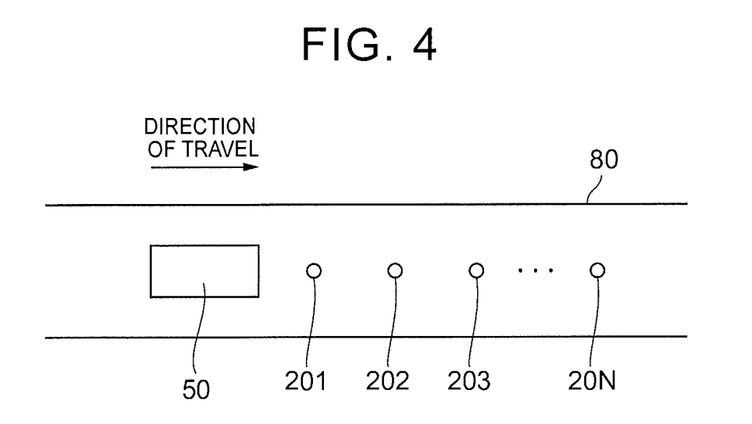
FIG. 4 is a view that illustrates an operation control method according to the embodiment.
Figure 5:
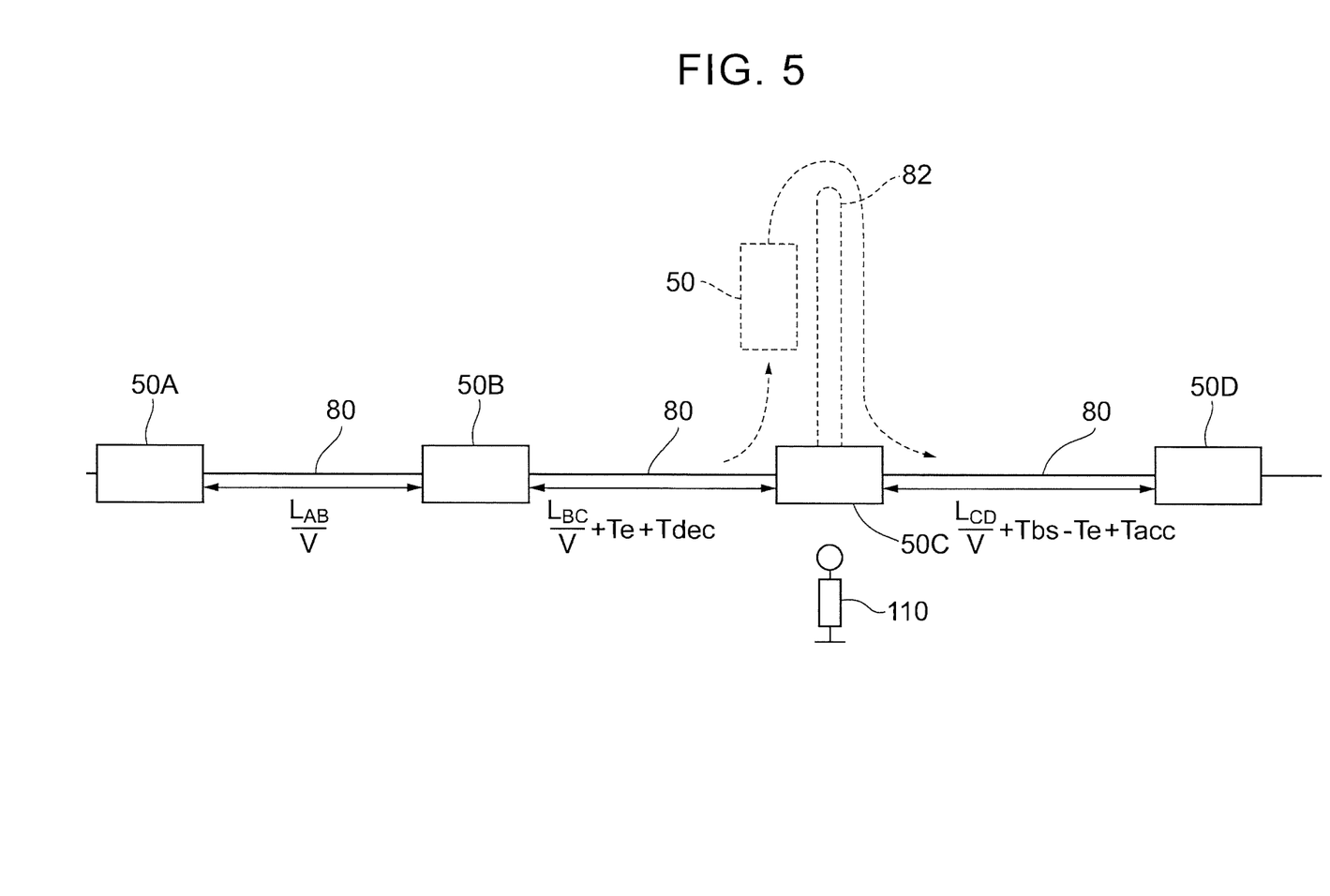
FIG. 5 is a view that illustrates the operation control method according to the embodiment.

Next, the operation control method according to the present embodiment will be described with reference to FIG. 4 to FIG. 6. Each vehicle 50 periodically sends the positional information of the host vehicle to the operation control apparatus 10. The operation control apparatus 10 holds the positional information of each vehicle 50. The operation control apparatus 10 sends operation instructions to the vehicles 50 such that a time interval at which the vehicles 50 pass a selected point in the route 80 is substantially constant. With this configuration, the vehicles 50 are able to reach each stop 110 at a set time interval. The time interval adjusted to be substantially constant in this way corresponds to a time obtained by dividing a time required for each vehicle 50 to go around along the route 80 by the number of the vehicles 50 running along the route 80. The time interval is referred to as "reference vehicle time interval". A process of controlling the operations of the vehicles 50 such that a time interval at which the vehicles 50 pass a selected point in the route 80 coincides with the reference vehicle time interval is referred to as "time interval stabilizing process". In the specification, a time interval between two vehicles means a time required from when one of the two vehicles passes a certain point to when the other one of the two vehicles passes the point.

In an off-peak time period for passengers to use the vehicles, the reference vehicle time interval extends as a result of a reduction in the number of the vehicles 50 running along the route 80. On the other hand, in an on-peak time period for passengers to use the vehicles, the reference vehicle time interval shortens as a result of an increase in the number of the vehicles 50 running along the route 80.

The time interval stabilizing process will be described with reference to FIG. 4. Each of the reference numerals 201, 202, 203, . . . 20N indicates a desired arrival position of the vehicle 50 at different designated time. For example, the reference numeral 201 indicates the desired arrival position of the vehicle 50 at designated time t0. The reference numeral 202 indicates the desired arrival position of the vehicle 50 at designated time (t0+t). The reference numeral 203 indicates the desired arrival position of the vehicle 50 at designated time (t0+2t). The reference numeral 20N indicates the desired arrival position of the vehicle 50 at designated time {t0+(N−1)t}. N is an integer greater than or equal to two. N may be, for example, ten. Time t0 is time after a lapse of a period of time t from present time. The period of time t is a selected period of time. The period of time t may be, for example, one second. The desired arrival positions of each vehicle 50 at designated time t0, designated time (t0+t), designated time (t0+2t), . . . , designated time {t0+(N−1)t} are calculated such that the time interval at which the vehicles 50 pass a selected point along the route 80 coincides with the reference vehicle time interval. The operation control apparatus 10 sends the desired arrival positions of each vehicle 50 at designated time t0, designated time (t0+t), designated time (t0+2t), . . . , designated time {t0+(N−1)t} to the vehicle 50 as an operation instruction.

The vehicle 50 that has received the desired arrival positions as the operation instruction adjusts the speed so as to be able to reach the desired arrival positions at the designated times. The steady-state speed and maximum speed of the vehicle 50 are determined in advance. The steady-state speed is, for example, 10 km/h. The maximum speed is, for example, 19 km/h. When the vehicle 50 is not able to reach a desired arrival position at designated time at the steady-state speed, the vehicle 50 may accelerate within the range in which the vehicle 50 can accelerate safely. Even when the vehicle 50 is able to reach a desired arrival position at designated time at the steady-state speed, but when a distance from a preceding vehicle is shorter than a threshold, the vehicle 50 may run at a reduced speed. The vehicle 50 is not necessarily required to reach a desired arrival position at designated time and should run at a speed at which the vehicle 50 is able to run safely.

The reference vehicle time interval can be changed with an increase or reduction in the number of the vehicles 50 running along the route 80. In this case, each vehicle 50 should invalidate an operation instruction received before the reference vehicle time interval is changed and run in accordance with an operation instruction received after the reference vehicle time interval is changed. When a desired arrival position of the vehicle 50 at designated time is located behind a current position of the vehicle 50 in a direction of travel, the vehicle 50 should gradually reduce the speed without an abrupt stop or backing-up.

Next, the reference vehicle time interval will be described in detail with reference to FIG. 5. For the sake of convenience of description, when the four vehicles 50 running along the route 80 are distinguished from one another, those are respectively referred to as vehicle 50A, vehicle 50B, vehicle 50C, and vehicle 50D. When the four vehicles 50 are not distinguished from one another, those are collectively referred to as vehicles 50. The length of one circumference of the route 80 is denoted by L. The steady-state speed of each vehicle 50 is denoted by V. The number of the vehicles 50 running along the route 80 is denoted by Nv. In the example shown in FIG. 5, Nv=4. An average period of time during which the vehicles 50 are stopped at each stop 110 is denoted by Tbs. An actual period of time during which each vehicle 50 is stopped at each stop 110 is denoted by Te. A period of time required for the vehicle speed to change from the steady-state speed to zero as a result of deceleration of each vehicle 50 to stop at each stop 110 is denoted by Tdec. A period of time for the vehicle speed to change from zero to the steady-state speed after departure of each vehicle 50 from each stop 110 is denoted by Tacc. The distance between the vehicle 50A and the vehicle 50B is denoted by $L_{AB}$. The distance between the vehicle 50B and the vehicle 50C is denoted by $L_{BC}$. The distance between the vehicle 50C and the vehicle 50D is denoted by $L_{CD}$. It is assumed that there is an imaginary extension route 82 at each stop 110, and, while each vehicle 50 is stopped at the stop 110, the vehicle 50 is presumed to imaginarily run along the extended route 82 at the steady-state speed. The length of the extended route 82 is denoted by Tbs×V.

The time interval between the vehicle 50A and the vehicle 50B is $L_{AB}/V$. The time interval between the vehicle 50B and the vehicle 50C is $L_{BC}/V$+Te+Tdec. The time interval between the vehicle 50C and the vehicle 50D is $L_{CD}/V$+ Tbs−Te+Tacc.

The total sum of Tbs at all the stops 110 in the route 80 is denoted by σ1. The total sum of Tdec at all the stops 110 in the route 80 is denoted by σ2. The total sum of Tacc at all the stops 110 in the route 80 is σ3. The reference vehicle time interval is denoted by Ts. In this case, Ts=(L/V+σ1+σ2+σ3)/Nv.

Of the plurality of vehicles 50, the vehicle 50B is focused, the time interval between the vehicle SOB and the vehicle 50C running ahead of the vehicle SOB is denoted by Tf, and the time interval between the vehicle SOB and the vehicle 50A running behind the vehicle 50B is denoted by Tb. When Tf Ts and Tb Ts, the operation control apparatus 10 sends an operation instruction to the vehicle SOB such that the vehicle SOB is able to reach a desired arrival position at designated time while maintaining the steady-state speed. Similarly, when Tf<Ts and Tb<Ts, the operation control apparatus 10 sends an operation instruction to the vehicle 50B such that the vehicle 50B is able to reach a desired arrival position at designated time while maintaining the steady-state speed. On the other hand, when Tf Ts and Tb<Ts, the operation control apparatus 10 sends an operation instruction to the vehicle 50B such that the vehicle 50B is able to reach a desired arrival position at designated time at a speed higher than the steady-state speed. When Tf<Ts and Tb>Ts, the operation control apparatus 10 sends an operation instruction to the vehicle 50B such that the vehicle 50B is able to reach a desired arrival position at designated time at a speed lower than the steady-state speed.

Next, the time interval stabilizing process will be described with reference to FIG. 6 by way of, for example, the case where, of a plurality of vehicles 50A, 50B, 50C that run in the autonomous driving mode, the driving mode of the vehicle 50C switches from the autonomous driving mode to the manual driving mode.

Figure 6:
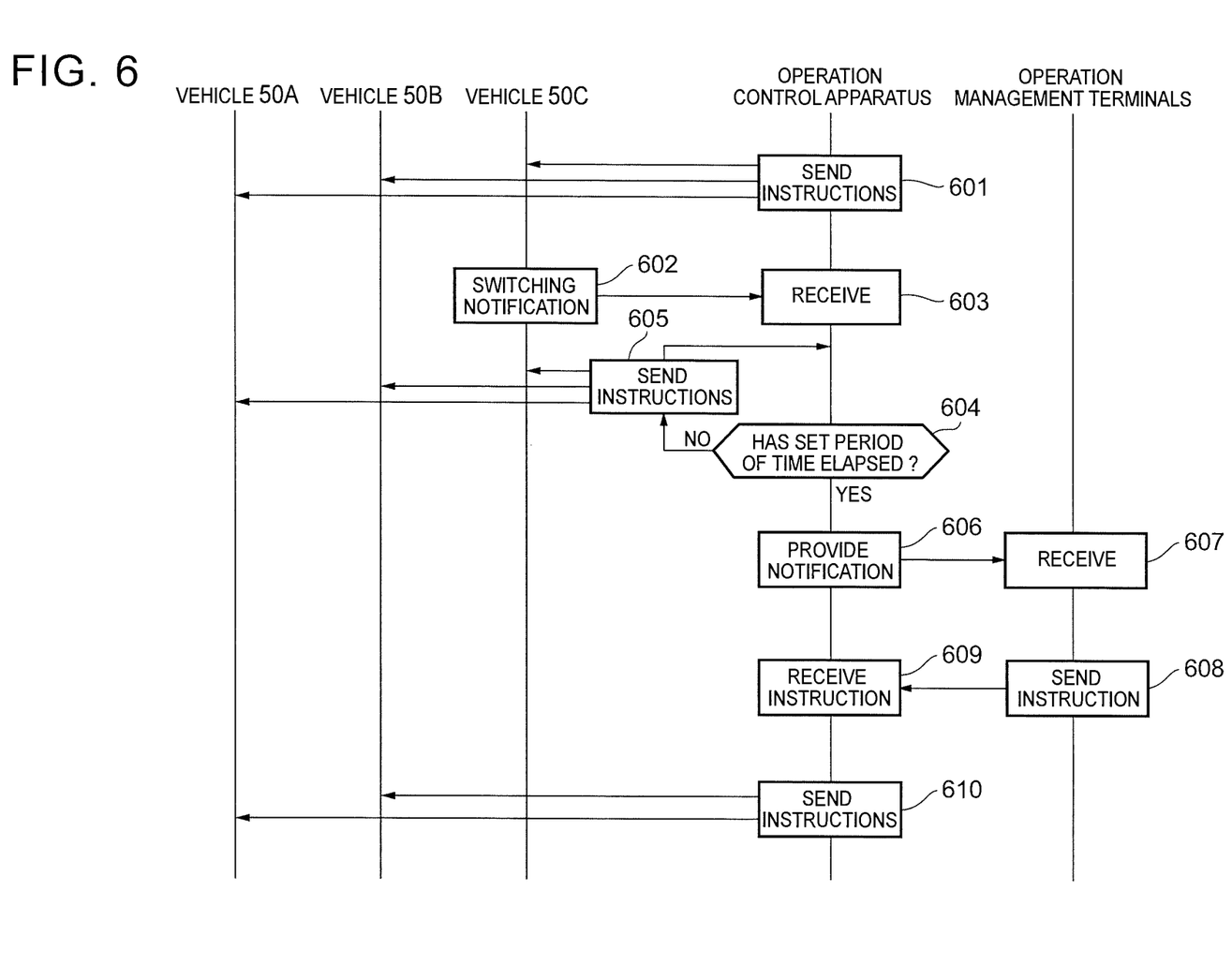
FIG. 6 is a timing chart that shows a flowchart of a process related to the operation control method according to the embodiment.

FIG. 6 is a timing chart that shows a flowchart of a process related to the operation control method according to the present embodiment. In step 601, the operation control apparatus 10 sends operation instructions to the vehicles 50A, 50B, 50C such that a time interval at which the vehicles 50A, 50B, 50C running in the autonomous driving mode pass a selected point in the route 80 is substantially constant. The vehicle control apparatus 53 of each of the vehicles 50A, 50B, 50C controls running of the vehicle such that the vehicle moves to a position designated by the operation control apparatus 10 at time designated by the operation control apparatus 10.

In step 602, the communication device 52 of the vehicle 50C, in response to an instruction from the boarding staff 51, provides the operation control apparatus 10 with a notification that the vehicle 50C switches the driving mode from the autonomous driving mode to the manual driving mode and runs in the manual driving mode.

In step 603, the operation control apparatus 10 receives the driving mode switching notification from the vehicle 50C.

In step 604, the operation control apparatus 10 determines whether a set period of time has elapsed from when the operation control apparatus 10 has received the driving mode switching notification. The set period of time is, for example, five minutes.

In step 605, the operation control apparatus 10 sends operation instructions to the vehicles 50A, 50B, 50C such that a time interval at which the vehicle 50A having switched from the autonomous driving mode to the manual driving mode and the vehicles 50A, 50B that continue running in the autonomous driving mode pass a selected point in the route 80 is substantially constant in a set period of time from when the operation control apparatus 10 has received the driving mode switching notification. The vehicle control apparatus 53 of each of the vehicles 50A, 50B, 50C controls running of the vehicle such that the vehicle moves to a position designated by the operation control apparatus 10 at time designated by the operation control apparatus 10.

In step 606, the operation control apparatus 10 provides the operation management terminal 20 with a notification that the set period of time has elapsed from when the operation control apparatus 10 has received the driving mode switching notification.

In step 607, the operation management terminal 20 receives the notification that the set period of time has elapsed from when the operation control apparatus 10 has received the driving mode switching notification. With this configuration, the operation management staff 21 who operates the operation management terminal 20 is able to learn the fact that the set period of time has elapsed from when the driving mode of the vehicle 50C has switched from the autonomous driving mode to the manual driving mode. At this time, the operation management staff 21 is able to check whether the time interval stabilizing process should be applied to the vehicle SOC by talking to the boarding staff 51 of the vehicle 50C via voice call through, for example, a telephone line. Here, the processes of step 608, step 609, and step 610 will be described by way of, for example, the case where the boarding staff 51 has indicated an intention to continue running in the manual driving mode without applying the time interval stabilizing process to the vehicle 50C.

In step 608, the operation management terminal 20 sends, to the operation control apparatus 10, an instruction not to apply the time interval stabilizing process to the vehicle 50C.

In step 609, the operation control apparatus 10 receives the instruction not to apply the time interval stabilizing process to the vehicle 50C.

In step 610, the operation control apparatus 10 sends operation instructions to the vehicles 50A, 50B that continue running in the autonomous driving mode such that a time interval at which the vehicles 50A, 50B that continue running in the autonomous driving mode, other than the vehicle 50C having switched from the autonomous driving mode to the manual driving mode, pass a selected point in the route 80 is substantially constant.

According to the present embodiment, before a set period of time elapses from when the driving mode of the vehicle 50C that is any one of the vehicles 50A, 50B, 50C running in the autonomous driving mode, in consideration of the possibility that the driving mode of the vehicle 50C switches from the manual driving mode to the autonomous driving mode again, by applying the time interval stabilizing process not only to the vehicles 50A, 50B but also to the vehicle 50C, influence that the remaining vehicles 50A, 50B receive as a result of not applying the time interval stabilizing process to the vehicle 50C just after the driving mode of the vehicle 50C has switched from the autonomous driving mode to the manual driving mode (a change of a position designated by the operation control apparatus 10 at time designated by the operation control apparatus 10) is reduced, so an irregularity in the operations of the vehicles 50 can be avoided. The case where there is a possibility that the driving mode of the vehicle 50C switches from the manual driving mode to the autonomous driving mode again is, for example, a case where, to avoid an obstacle in the route 80, the driving mode of the vehicle 50C has been just switched from the autonomous driving mode to the manual driving mode temporarily, or another case. In such a case, the boarding staff 51 desirably, for example, avoids the obstacle in the route 80 in the manual driving mode and then quickly switches into the autonomous driving mode.

In step 602, the communication device 52 of the vehicle 50C, in response to an instruction from the boarding staff 51, may provide the operation control apparatus 10 with not only a notification that the driving mode of the vehicle 50C switches from the autonomous driving mode to the manual driving mode and runs but also a notification that the vehicle 50C runs in the manual driving mode without applying the time interval stabilizing process to the vehicle 50C. For example, when there occurs an abnormality in the vehicle 50C and the vehicle 50C more desirably runs in the manual driving mode than in the autonomous driving mode for safety reasons, the communication device 52 may quickly provide the operation control apparatus 10 with a notification that the vehicle 50C runs in the manual driving mode without applying the time interval stabilizing process to the vehicle 50C.

When the operation management staff 21 makes sure an intention to switch the driving mode of the vehicle 50C from the manual driving mode to the autonomous driving mode again by talking to the boarding staff 51 of the vehicle 50C on the phone, the operation management terminal 20, in step 608, may send, to the operation control apparatus 10, an instruction to apply the time interval stabilizing process to the vehicle 50C. When the operation management staff 21 is not able to contact the boarding staff 51 of the vehicle 50C, the operation management terminal 20, in step 608, may send, to the operation control apparatus 10, an instruction not to apply the time interval stabilizing process to the vehicle 50C.

The operation control apparatus 10 functions as units configured to execute the above-described operation control method (step 601, step 603, step 604, step 605, step 606, step 609, and step 610 in FIG. 6). Those units are not necessarily required to be implemented by cooperation between the hardware resources of the operation control apparatus 10 and the operation control program 15, and may be implemented by using, for example, exclusive hardware resources (for example, an application specific integrated circuit (ASIC), a field programmable gate array (FPGA), or the like) of the operation control apparatus 10.

The above-described embodiment is intended to easily understand the disclosure and is not intended to interpret the disclosure limitedly. The disclosure may be modified or improved without departing from the spirit, and the disclosure also encompasses equivalents thereof.

What is claimed is:

1. An operation control apparatus that controls operations of vehicles that run around along a predetermined route in a driving mode that is any one of an autonomous driving mode and a manual driving mode, the operation control apparatus comprising:

circuitry configured to
send operation instructions to the vehicles running in the autonomous driving mode such that a time interval at which the vehicles running in the autonomous driving mode pass a selected point in the predetermined route is substantially constant;
receive, from any one of the vehicles running in the autonomous driving mode, a notification that the any one of the vehicles switches the driving mode into the manual driving mode and runs in the manual driving mode in response to an instruction of a boarding staff; and
send operation instructions to a first vehicle of which the driving mode has switched from the autonomous driving mode to the manual driving mode and a second vehicle that continues running in the autonomous driving mode such that a time interval at which the first vehicle having switched from the autonomous driving mode to the manual driving mode and the second vehicle that continues running in the autonomous driving mode pass a selected point in the predetermined route is substantially constant in a set period of time from when the operation control apparatus has received the notification, the second vehicle running ahead of the first vehicle, wherein the predetermined route is constructed in a closed curve shape.

2. An operation management system comprising:
the operation control apparatus according to claim 1; and
an operation management terminal that an operation management staff who manages the operations of the vehicles operates, wherein the operation control apparatus is configured to, after a set period of time has elapsed from when the operation control apparatus has received the notification, provide the operation management terminal with a notification that the set period of time has elapsed.

3. The operation management system according to claim 2, wherein the operation control apparatus further includes circuitry configured to, in response to an instruction from the operation management terminal that has received the notification that the set period of time has elapsed, send an operation instruction to the vehicle that continues running in the autonomous driving mode such that a time interval at which the vehicles that continue running in the autonomous driving mode, other than the vehicle having switched from the autonomous driving mode to the manual driving mode, pass a selected point in the predetermined route is substantially constant.

4. An operation control method comprising:
sending, by an operation control apparatus that controls operations of vehicles that run around along a predetermined route in a driving mode that is any one of an autonomous driving mode and a manual driving mode, operation instructions to the vehicles running in the autonomous driving mode such that a time interval at which the vehicles running in the autonomous driving mode pass a selected point in the predetermined route is substantially constant;
receiving, from any one of the vehicles running in the autonomous driving mode, a notification that the any one of the vehicles switches the driving mode into the manual driving mode and runs in the manual driving mode in response to an instruction of a boarding staff; and
sending operation instructions to a first vehicle of which the driving mode has switched from the autonomous driving mode to the manual driving mode and a second vehicle that continues running in the autonomous driving mode such that a time interval at which the first vehicle having switched from the autonomous driving mode to the manual driving mode and the second vehicle that continues running in the autonomous driving mode pass a selected point in the predetermined route is substantially constant in a set period of time from when the operation control apparatus has received the notification, the second vehicle running ahead of the first vehicle, wherein predetermined route is constructed in a closed curve shape.

5. The operation control apparatus according to claim 1, wherein the time interval at which the vehicles running in the autonomous driving mode pass the selected point in the predetermined route is obtained by dividing a time required for each vehicle to go around the predetermined route by a number of vehicles running along the predetermined route.

6. The operation control apparatus according to claim 1, wherein the circuitry is configured to send operation instructions to a third vehicle and a fourth vehicle such that a time interval at which the third vehicle and the fourth vehicle pass a selected point in the predetermined route is substantially constant in a set period of time, the third vehicle having switched from the autonomous driving mode to the manual driving mode and then switched from the manual driving mode to the autonomous driving mode again, the fourth vehicle continuing running in the autonomous driving mode.

7. The operation control method according to claim 4, further comprising sending operation instructions to a third vehicle and a fourth vehicle such that a time interval at which the third vehicle and the fourth vehicle pass a selected point in the predetermined route is substantially constant in a set period of time, the third vehicle having switched from the autonomous driving mode to the manual driving mode and then switched from the manual driving mode to the autonomous driving mode again, the fourth vehicle continuing miming in the autonomous driving mode.

* * * * *